United States Patent [19]

Kondo et al.

[11] Patent Number: 5,781,242
[45] Date of Patent: Jul. 14, 1998

[54] IMAGE PROCESSING APPARATUS AND MAPPING METHOD FOR FRAME MEMORY

[75] Inventors: Kazuhiko Kondo; Minoru Takeuchi, both of Ogaki, Japan

[73] Assignee: Sanyo Electric Co., Ltd., Osaka, Japan

[21] Appl. No.: 799,341

[22] Filed: Feb. 13, 1997

[30] Foreign Application Priority Data

Feb. 13, 1996 [JP] Japan ................................ 8-025631
Feb. 14, 1996 [JP] Japan ................................ 8-026984

[51] Int. Cl.$^6$ ........................... H04N 5/77; H04N 5/907
[52] U.S. Cl. ........................ 348/441; 348/716; 348/718
[58] Field of Search ........................ 348/390, 441, 348/716, 718; H04N 5/77, 5/907

[56] References Cited

U.S. PATENT DOCUMENTS

| 5,379,072 | 1/1995 | Kondo | 348/441 |
| 5,510,857 | 4/1996 | Kopet | 348/718 |
| 5,581,310 | 12/1996 | Vinekar | 348/718 |
| 5,619,282 | 4/1997 | Song | 348/716 |

Primary Examiner—Howard W. Britton
Attorney, Agent, or Firm—Sheridan Ross PC

[57] ABSTRACT

An image processing apparatus for storing image data into or from a frame memory is disclosed. The image data includes plural pieces of element data arranged in a matrix form of first predetermined numbers of rows and columns. The image processing apparatus includes a memory controller for controlling access to the frame memory for writing or reading the image data in or from the frame memory. The memory controller is configured to access the frame memory in either a raster unit consisting of one line of plural pieces of element data in the first predetermined numbers of rows and columns or a block unit consisting of plural pieces of element data arranged in a matrix of second predetermined numbers of rows and columns. The second predetermined number is smaller than the first predetermined number. A raster access address generator is connected to the memory controller and generates a raster access address for accessing the frame memory to write or read the image data in the raster unit. A block access address generator is connected to the memory controller and generates a block access address for accessing said frame memory to write and read the image data in the block unit.

10 Claims, 10 Drawing Sheets

Fig.5

| | L0 | L1 | L2 | L3 | L4 | L5 | L6 | L7 | L8 | L9 | L10 | L11 | | L479 |
|---|---|---|---|---|---|---|---|---|---|---|---|---|---|---|
| | p(639,0) | p(639,1) | p(639,2) | p(639,3) | p(639,4) | p(639,5) | p(639,6) | p(639,7) | p(639,8) | p(639,9) | p(639,10) | p(639,11) | | p(639,479) |
| G1 | ⋮ | ⋮ | ⋮ | ⋮ | ⋮ | ⋮ | ⋮ | ⋮ | ⋮ | ⋮ | ⋮ | ⋮ | | ⋮ |
| G2 | p(8,0) | p(8,1) | p(8,2) | p(8,3) | p(8,4) | p(8,5) | p(8,6) | p(8,7) | p(8,8) | p(8,9) | p(8,10) | p(8,11) | | p(8,479) |
| G2 | p(7,0) | p(7,1) | p(7,2) | p(7,3) | p(7,4) | p(7,5) | p(7,6) | p(7,7) | p(7,8) | p(7,9) | p(7,10) | p(7,11) | | p(7,479) |
| G2 | p(6,0) | p(6,1) | p(6,2) | p(6,3) | p(6,4) | p(6,5) | p(6,6) | p(6,7) | p(6,8) | p(6,9) | p(6,10) | p(6,11) | | p(6,479) |
| B1 | p(5,0) | p(5,1) | p(5,2) | p(5,3) | p(5,4) | p(5,5) | p(5,6) | p(5,7) | p(5,8) | p(5,9) | p(5,10) | p(5,11) | ⋯ | p(5,479) |
| | p(4,0) | p(4,1) | p(4,2) | p(4,3) | p(4,4) | p(4,5) | p(4,6) | p(4,7) | p(4,8) | p(4,9) | p(4,10) | p(4,11) | | p(4,479) |
| | p(3,0) | p(3,1) | p(3,2) | p(3,3) | p(3,4) | p(3,5) | p(3,6) | p(3,7) | p(3,8) | p(3,9) | p(3,10) | p(3,11) | | p(3,479) |
| | p(2,0) | p(2,1) | p(2,2) | p(2,3) | p(2,4) | p(2,5) | p(2,6) | p(2,7) | p(2,8) | p(2,9) | p(2,10) | p(2,11) | | p(2,479) |
| | p(1,0) | p(1,1) | p(1,2) | p(1,3) | p(1,4) | p(1,5) | p(1,6) | p(1,7) | p(1,8) | p(1,9) | p(1,10) | p(1,11) | | p(1,479) |
| | p(0,0) | p(0,1) | p(0,2) | p(0,3) | p(0,4) | p(0,5) | p(0,6) | p(0,7) | p(0,8) | p(0,9) | p(0,10) | p(0,10) | | p(0,479) |

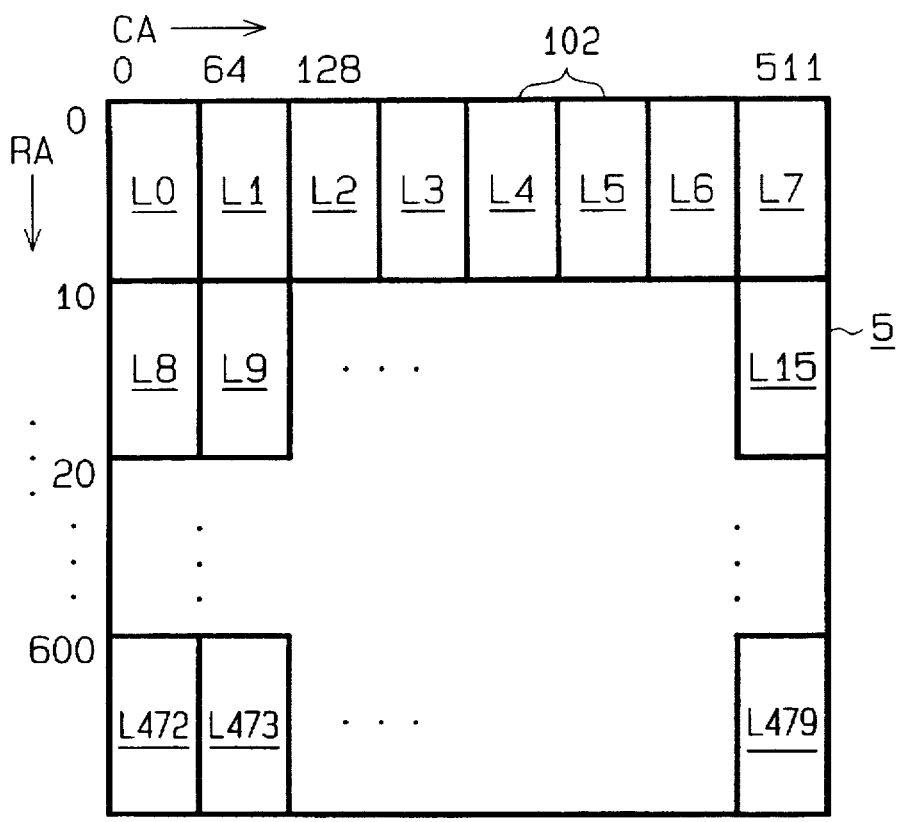

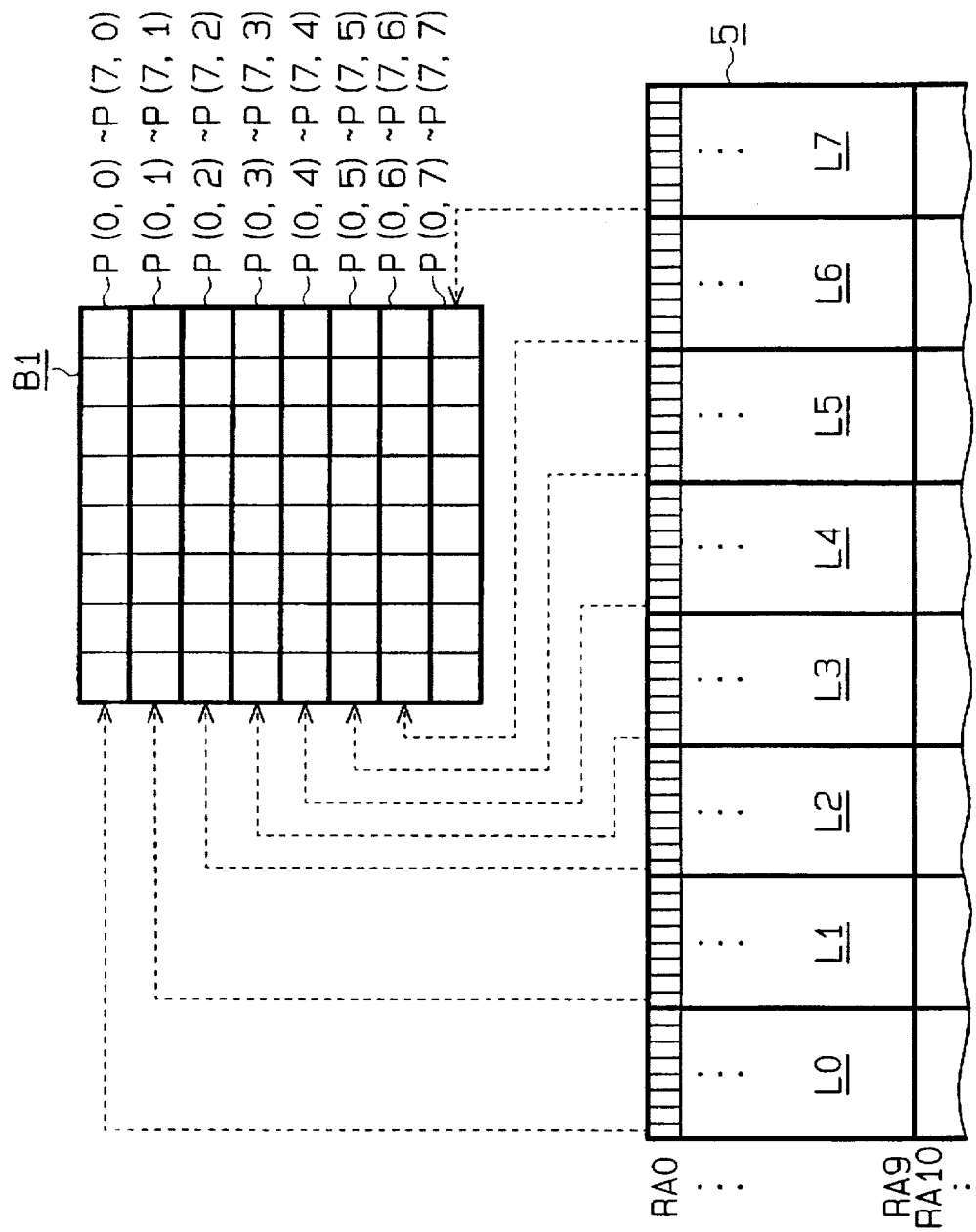

IMAGE PROCESSING APPARATUS AND MAPPING METHOD FOR FRAME MEMORY

BACKGROUND OF THE INVENTION

1. Field of the Invention

The present invention relates generally to an image processing apparatus and a mapping method for a frame memory. More particularly, this invention relates to an image processing apparatus and a mapping method for a frame memory that increases the speed of writing and reading compressed image data from a frame memory.

2. Description of the Related Art

The JPEG (Joint Photographic Experts Group) standards (ISO/IEC 10918-1) is a popular image data compression/decompression (codec) technique. Image processing apparatuses that conform to the JPEG standards typically have a JPEG codec that receives image data from an input unit like a camera, compresses the data and stores it on a memory device such as an optical disk. Further, JPEG codecs read compressed image data from memory devices, decompresses the data and supply it as a video signal to a display unit like a CRT.

In general, a screen of image data typically includes plural pieces of pixel data. In compressing or decompressing image data, JPEG codecs handle image data in a block by block manner (i.e., 8×8 pixels). Input units like a camera and display units like television handle image data in a raster format. Accordingly, image processing apparatuses typically perform raster-block conversion of image data using JPEG codec's frame memory. This type of frame memory generally has sufficient capacity to store one screen of image data, and can be realized by using a DRAM which operates in fast page mode. Image data is then mapped onto memory in a raster manner to appropriately store the data.

FIG. 1 shows an exemplary image data 51 consisting of 640×480 pieces of pixel data 52, the image data 51 is stored on a page in the frame memory in a line by line (640 pixels) manner based on a change in a column address (CA) having a fixed row address (RA). In general, the fixed row address RA contributes to speed up memory access operations. By way of example, the JPEG codec accesses a frame memory, image data stored in the frame memory is read in a block by block manner (i.e., 8×8 pixels).

In motion JPEG, high-resolution image data of about 640×480 or more pieces of image data, is compressed and decompressed in full motion (30 frames/sec). Further in motion JPEG, two fields (one frame) of image data are stored in a 1/30 sec time span. In operation, the JPEG codec accesses the frame memory so as to read one frame of pixel data blocks in 1/30 sec. Specifically, the JPEG codec has to execute page-out to change the row address RA every time eight pieces of pixel data are read in such a manner that 8×8 pixel data blocks in eight lines of image data are read out in order. Unfortunately, such page-out operations slow down access to the frame memory, which is undesirable for motion JPEG that depends on high-speed processing.

In motion JPEG, an image processing apparatus simultaneously writes (or reads) image data into (or from) the frame memory in a raster manner and reads (or writes) image data from (or into) the memory in a block by block manner in the compression and decompression processes. That is, the image processing apparatus temporarily stores received image data into the frame memory in a raster manner and reads the image data in a block by block manner for data compression. Accordingly, image processing apparatus decompresses compressed image data, temporarily stores the decompressed image data in a block by block manner into the frame memory and reads the decompressed image data from the memory in a raster manner for display purposes.

One way to accomplish simultaneous writing and reading is to use image memories having memory capacity to store two frames, and to switch the units for writing and reading into and from the frame memory. This scheme however requires a frame memory having a large memory capacity, which inevitably increases circuit area. To avoid this shortcoming, one type of image processing apparatus uses a frame memory having memory capacity for one frame, however, writing and reading timings are necessarily interleaved.

Unfortunately, the raster write and read addresses may be overtaken by the block write and read addresses. This is because the address interval in the raster system differs from that in the block-by-block system. Since decompressed image data is displayed at predetermined time intervals (e.g., 30 frames per second), the access intervals in raster system are constant. Because image data to be compressed by a JPEG codec is variable-length data, the block-by-block access intervals are not constant. Accordingly, for compression of relatively short image data, the access intervals necessarily become shorter until the raster address is overtaken by the block address.

By way of example, suppose that the raster read address of the first decompressed image data from the frame memory is overtaken by the block write address of the second decompressed image data stored in frame memory. When this happens, a part of the first decompressed image data which remains unread in the frame memory is overwritten by a next second decompressed image data in a block by block manner. Consequently, the first and second decompressed image data are simultaneously displayed on the screen and noise appears on the screen.

In addition, suppose that the raster write address of the first image data for compression into the frame memory is overtaken by the block read address of the second image data for compression from the frame memory. Then, not only a part of the third image data for compression which is being written in the frame memory but also a part of image data which has been written in the frame memory before the first image data for compression is read in a block by block manner to be compressed.

A scheme for delaying the timing for starting image compression and decompression has been proposed to avoid such address overtaking. However this scheme has been found to be inadequate because it implements a fixed timing method. As can be appreciated, because the block-by-block access intervals of image data to be compressed or decompressed vary depending on the data length, the fixed delay timing method fails to solve this problem.

SUMMARY OF THE INVENTION

Broadly speaking, the present invention relates to a mapping method for a frame memory and an image processing apparatus, which facilitates fast access in a block by block manner.

The invention also relates to an image processing apparatus which prevents the address of the first image data to be written into (or read from) a frame memory from being overtaken by the address of second image data to be read from (or written into) the memory. The present invention can be implemented in numerous ways including as an apparatus and a method.

In one embodiment, an image processing apparatus for writing or reading image data consisting of plural pieces of element data is disclosed. The plural pieces of element data are arranged in a matrix form of first predetermined numbers of rows and columns. The image data is written in the frame memory in either a raster unit consisting of one line of plural pieces of element data in the first predetermined numbers of rows and columns and a block unit consisting of plural pieces of element data arranged in a matrix of second predetermined numbers of rows and columns. The image data is read from the frame memory in a unit different from one used in data writing. The second predetermined number is smaller than the first predetermined number. The image processing apparatus including a raster access address generator for generating a raster access address for accessing the frame memory to write or read the image data in the raster unit. The raster access address includes a raster column address and a raster row address. The raster column address is generated such that a number of raster units corresponding to an integer multiple of the second predetermined number of rows are accessed to the frame memory in a column direction. The raster row address is generated such that the one line of plural pieces of element data is accessed to the frame memory in a row direction while a row line is changed every number of element data equal to an integer multiple of the second predetermined number of columns. The image processing apparatus further includes a block access address generator for generating a block access address for accessing the frame memory to write and read the image data in the block unit. The block access address includes a block column address and a block row address. The block column address is generated such that plural pieces of the element data are accessed at intervals to the frame memory in a column direction, row by row in the second predetermined number of rows. The block row address is generated such that a same row in the frame memory is accessed while rows of element data in one block are accessed at intervals to the frame memory in column direction in accordance with the block column address.

In another embodiment, an image processing apparatus including a frame memory for storing image is disclosed. The image data includes plural pieces of element data arranged in a matrix form of first predetermined numbers of rows and columns. The image processing apparatus includes a memory controller for controlling access to the frame memory for writing or reading the image data in or from the frame memory. The memory controller is configured to access the frame memory in either a raster unit consisting of one line of plural pieces of element data in the first predetermined numbers of rows and columns or a block unit consisting of plural pieces of element data arranged in a matrix of second predetermined numbers of rows and columns. The second predetermined number is smaller than the first predetermined number. A raster access address generator is connected to the memory controller and generates a raster access address for accessing the frame memory to write or read the image data in the raster unit. A block access address generator is connected to the memory controller and generates a block access address for accessing the frame memory to write or read the image data in the block unit. The image processing apparatus further includes an address comparator, connected to the raster access address generator and the block access address generator. The address comparator is configured to compare the raster access address with the block access address and supply an interruption signal for causing the memory controller to interrupt access to the frame memory in accordance with a difference between the raster access address and the block access address.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a diagram showing the structure of image data;

FIG. 6 is a diagram illustrating mapping of image data into a frame memory according to a first embodiment of the invention;

FIG. 7 is a diagram illustrating access to image data in the frame memory in a raster manner;

FIG. 8 is a diagram illustrating access to the frame memory in a block by block manner;

DETAILED DESCRIPTION OF THE PREFERRED EMBODIMENTS

Figure 1:
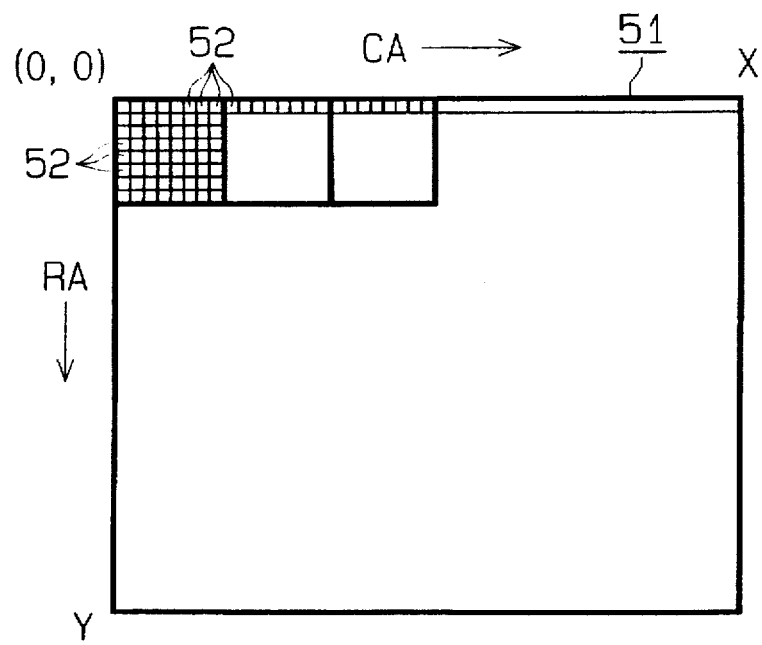
FIG. 1 is a diagram illustrating mapping of image data into a frame memory according to prior art.
Figure 2:
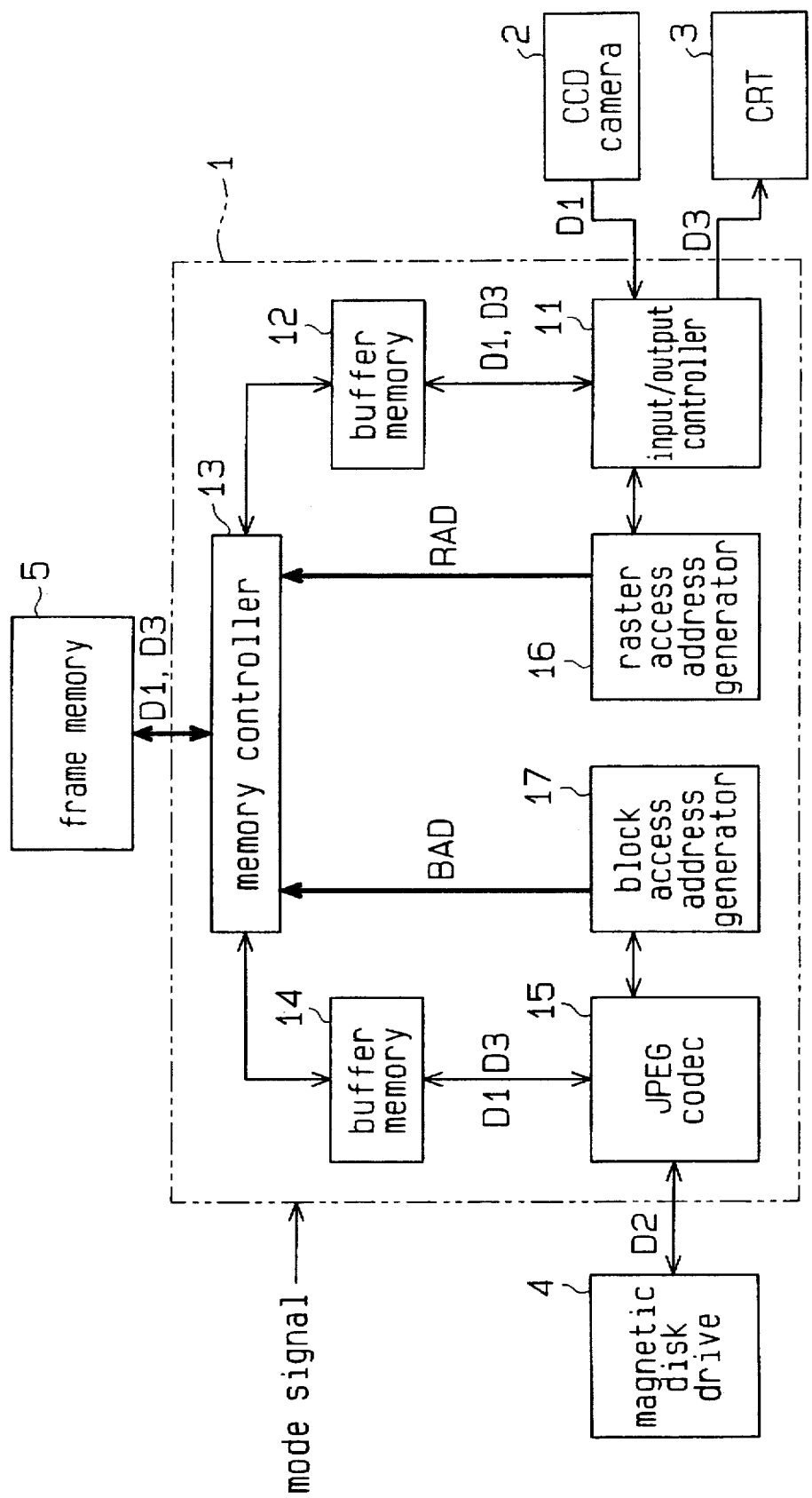
FIG. 2 is a block diagram showing an image processing apparatus according to a first embodiment of the invention.

An image processing apparatus according to one embodiment of the present invention will now be described referring to the accompanying drawings. As shown in FIG. 2, an image processing apparatus 1 is connected to a CCD (Charge Coupled Device) camera 2 as an input unit, a CRT 3 as a display unit, a magnetic disk drive 4 and a frame memory 5. The CCD camera 2 generates image data G1 (see FIG. 5) of a color still picture or the like including a plurality of pieces of pixel data G2, and supplies the image data G1 as input data D1 to the image processing apparatus 1.

At the time of recording moving pictures, the image processing apparatus 1 receives input image data D1 from the CCD camera 2 and temporarily stores the input image data D1 in the frame memory 5 in a raster manner. The processing apparatus 1 further reads the input image data D1 in a block by block manner from the frame memory 5 and compresses each block of image data in accordance with the JPEG algorithm. One block of image data consists of 8×8 pixel data. Therefore, the image processing apparatus 1 uses the frame memory 5 to execute raster-block conversion of image data. Compressed image data D2 is supplied to the magnetic disk drive 4 to be stored on a magnetic disk that is located in the magnetic disk drive 4.

In this embodiment the frame memory 5 preferably has a sufficient capacity to store one screen of image data G1. By way of example, the frame memory 5 is preferably a DRAM which can operate in fast page mode. In this embodiment, one line of input image data D1 is stored in the frame memory 5 such that it is arranged horizontally and moved down one row line every time its number reaches a certain integer multiple number of horizontal pixels (eight pixels in this case) in one block of image data. Suppose that the image data G1 consists of 480×640 pixel data. Of the image data G1, one line image data L0 (see FIG. 5) is stored in the frame memory 5, turned back and moved down at every 64-th column as shown in FIG. 6. When the frame memory 5 has a 512 column structure, for example, each row line is equally divided in eight every 64 columns. Each line of image data is stored in its own associated column section (0 to 63, 64 to 128, . . .). That is, each row line of the frame memory 5 is equally divided by every integer multiple of the number of vertical pixels (eight pixels in this case) in block pixel data, and each line image data is stored in the associated column section. In other words, a memory area 102 for one line image data is defined by 64 columns and 10 rows in this embodiment.

It should be appreciated that the amount of pixels contained in one screen of image data may take values other than 640×480, for example, 320×240 or 1280×1200 values may be implemented. However, capacity of the frame memory 5 should preferably be set in accordance with the number of pixels in image data.

In reproduction of moving pictures, the image processing apparatus 1 receives compressed image data D2 from the magnetic disk drive 4 and decompresses this image data D2 in accordance with the JPEG algorithm. Further, the processing apparatus 1 temporarily stores decompressed image data D3 into the frame memory 5 in a block by block manner, and then reads the image data D3 from the frame memory 5 in a raster manner, and supplies it to the CRT 3. That is, the decompressed image data D3 is discretely stored in a raster manner in the frame memory 5 in each column section.

In this embodiment, the image processing apparatus 1 operates the frame memory 5 in fast page mode, and interleaves raster access to image data (input and decompressed image data D1 and D3) and block-by-block access to image data. The fast page mode allows the image processing apparatus 1 to continuously input the input image data D1 or to continuously output the decompressed image data D3. Preferably, interleaving permits the input of the input image data D1 to (or the output of the decompressed image data D3 from) the processing apparatus 1 and the input/output of the compressed image data D2 to be executed simultaneously.

As shown in FIG. 2, the image processing apparatus 1 includes an input/output controller 11, a buffer memory 12, a memory controller 13, a buffer memory 14, a JPEG codec 15, a raster access address generator 16 and a block access address generator 17.

In the moving-picture record mode, the input image data D1 supplied from the CCD camera 2 is stored in raster in the frame memory 5 via the input/output controller 11, the buffer memory 12 and the memory controller 13. The image data D1 is read out in a block by block manner from the frame memory 5 and supplied to the JPEG codec 15 via the memory controller 13 and the buffer memory 14. The image data D2 compressed by the JPEG codec 15 is supplied to the magnetic disk drive 4.

In the moving-picture reproduction mode, the compressed image data D2 supplied from the magnetic disk drive 4 is supplied to the JPEG codec 15. The image data D3 decompressed by the JPEG codec 15 is supplied to the frame memory 5 in a block by block manner via the buffer memory 14 and the memory controller 13. The decompressed image data D3 is read from the frame memory 5 in a raster manner, and supplied to the CRT 3 via the buffer memory 12 and the input/output controller 11.

Raster Access Address Generator

The raster access address generator (hereinafter simply referred to as "raster address circuit") 16 generates raster address RAD using the coordinate values (x, y) of each pixel in image data and supplies this address RAD to the memory controller 13. The memory controller 13 accesses the frame memory 5 in accordance with the address RAD in such a manner that the input image data D1 is stored in a raster manner in the memory 5 in the record mode or the decompressed image data D3 is read in a raster manner from the memory 5 in the reproduction mode. Specifically, the raster address circuit 16 generates line addresses (RAa, CAa) for accessing the individual line image data L0–L479 in the image data D1 and D3 shown in FIG. 5 and pixel addresses (RAb, CAb) for accessing plural pieces of pixel data G2 which form the individual line image data L0–L479. The raster address circuit 16 adds each line address (RAa, CAa) and the associated pixel address (RAb, CAb) and supplies the result as raster address RAD (RA, CA) to the memory controller 13.

Access to the frame memory 5 using the raster address RAD will now be described with reference to FIGS. 5 to 7. As shown in FIG. 5, the coordinate values of each pixel data G2 in one screen of image data G1 is expressed by pixels p(0, 0) to p(639, 479) with the coordinate value x in the row direction (or the horizontal direction) and the coordinate value y in the column direction (or the vertical direction).

The CCD camera 2 outputs first line image L0 in the order of the pixel p(0, 0), p(1, 0), p(2, 0), . . . p(639, 0), then outputs second line image data L1 in order from the pixel p(0, 1). When the last (i.e., 480-th line) line image data L479 is output up to the pixel p(630, 479), the CCD camera 2 then outputs image data of the next screen in order from the pixel p(0, 0).

The memory controller 13 receives the raster address RAD from the raster address circuit 16, and stores the individual line image data L0–L479 in the frame memory 5 in accordance with that address RAD. As shown in FIG. 6, the individual line image data L0–L479 are stored in such a manner as to be turned back and moved down one row line at every 64-th pixel, so that eight pieces of line image data are stored in parallel in the direction of column addresses CA. That is, the number of columns in the column address (CA) direction is set to an integer multiple of the number of vertical pixels in the image data which is to be accessed in a block by block manner.

As shown in FIG. 7, one line of image is formed by 640 pieces of pixel data, and every 64 (=512/8) pieces of pixel data are stored in accordance with ten (=640/64) row addresses RA. In other words, 64 pieces of pixel data are stored at one row address. That is, the number of pixel data to be stored at one row address is set to an integer multiple of the number of horizontal pixels in the image data which is to be accessed in a raster manner. In the eighth line image data L7, for example, the pixel data p(0, 7) to p(63, 7) are stored in accordance with the row address RA0 and the column addresses CA448 to CA511, and the pixel data p(64, 7) to p(127, 7) are stored in accordance with the row address RA1 and the column addresses CA448 to CA511, and so forth. In this manner, the line image data L7 consisting of 640 pieces of pixel data p(0, 7) to p(639, 7) is stored at the row addresses RA0–RA9.

In the first line image data L0, the pixel data p(0, 0) to p(63, 0) are stored in accordance with the row address RA0 and the column addresses CA0 to CA63, and the pixel data p(64, 0) to p(127, 0) are stored in accordance with the row address RA1 and the column addresses CA0–CA63. In the second line image data L1, the pixel data p(0, 1) to p(63, 1) are stored in accordance with the row address RA0 and the column addresses CA54 to CA127, and the pixel data p(64, 1) to p(127, 1) are stored in accordance with the row address RA1 and the column addresses CA64–CA127. Accordingly, the individual 64 pieces of pixel data p(0, 0) to p(63, 0), p(0, 1) to p(63, 1), . . . and p(0, 7) to p(63, 7) of the line image data L0–L7 are stored at the same row address RA0. Each of the line image data L0–L7 is written at the same row address with 64 pieces of pixel data as one block. This permits the memory controller 13 to access the frame memory 5 to read pixel data in a raster manner (64 blocks) for compression without page-out.

The memory controller 13 reads the decompressed image data D3 from the frame memory 5 in accordance with the raster address RAD. In this case, no page-out is performed during reading of 64 pieces of pixel data. In other words, every time 64 pieces of pixel data are read out, page-out is executed. Advantageously, because the frequency of occurrence for this event is relatively low, the high-speed access is not influenced so much.

Further, this embodiment allows for the use of a buffer memory having a smaller capacity than that of the prior art, thus preventing the circuit area from undesirably becoming larger. This is because the buffer memory 12 in this embodiment should only have a sufficient capacity to temporarily store 64 pieces of pixel data which are read from the frame memory 5. The buffer memory in the prior art, by way of comparison, needs a large capacity for temporary storage of one line of image data, which leads to an increased circuit area.

Figure 3:
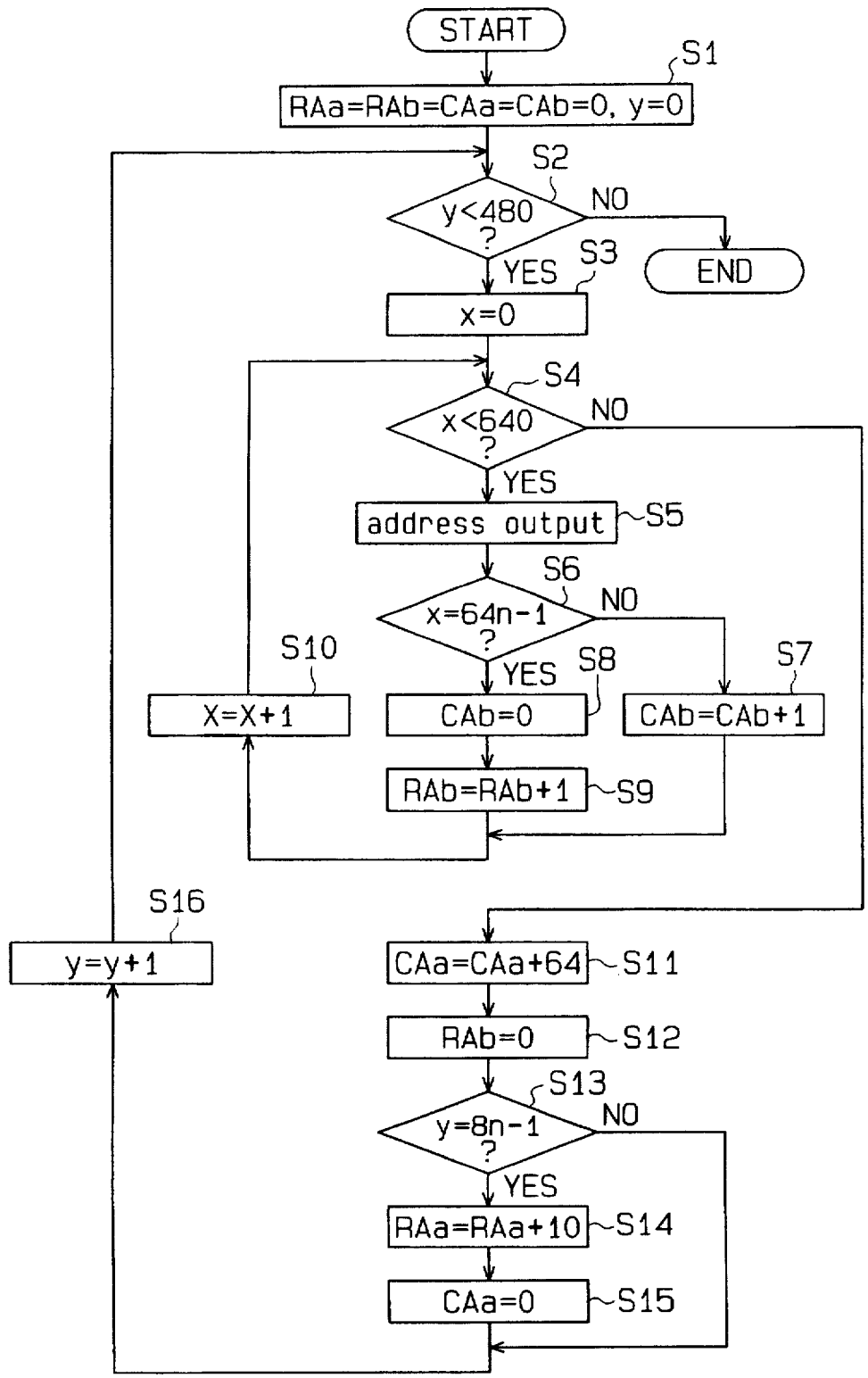
FIG. 3 is a flowchart illustrating the operation of a raster access address generator in the image processing apparatus in FIG. 1.

The generation of the raster address RAD (RA, CA) by the raster address circuit 16 will now be discussed referring to the flowchart in FIG. 3. The suffix "n" used in the flowchart is a natural number. In step 1, the raster address circuit 16 initializes all of the line and pixel row addresses RAa and RAb and the line and pixel column addresses CAa and CAb to "0" and initializes the coordinate value y corresponding to the first line L0 to be written to "0".

In step 2, the raster address circuit 16 determines based on the coordinate value y if the raster address RAD for one screen of image data D1 and D3 has been generated. When the coordinate value y is present between "0" to "479", i.e., when the coordinate value y<480, the raster address circuit 16 determines that processing of one screen of image data is in progress, and moves to step 3. In step 3, the coordinate value x is set to "0".

In step 4, the raster address circuit 16 determines based on the coordinate value x if the raster address RAD for one line of pixel data G2 has been generated. When the coordinate value x lies between "0" to "639", i.e., when the coordinate value x<640, the raster address circuit 16 determines that the generation of the raster address RAD for one line is in progress, and proceeds to step 5. In step 5, the raster address circuit 16 adds the line row address RAa and the pixel row address RAb to acquire a row address RA, and adds the line column address CAa and the pixel column address CAb to acquire a column address CA. In this manner, the address RAD that includes the row address RA and the column address CA is generated.

Repeating steps 4 to 10, the raster address circuit 16 generates the column addresses CAb of "0" to "63" in order with the row address RAb fixed. That is, every time the coordinate value X of each pixel data in one line image data is incremented by "1" (step 10), "1" is added to the pixel column address CAb (step 7). Steps 7 and 10 are then executed until the raster address RAD for 64 pieces of pixel data is generated (step 6). Thereafter, the pixel column address CAb is set to "0" in step 8 and "1" is added to the line row address RAb in step 9. Until the coordinate value x becomes 640 (step 4) and the line row address RAb changes from "0" to "1", "2" and so forth to "9", the raster address circuit 16 repeats the steps 5 to 10 to generate the raster address RAD for one line of image data.

Next, the raster address circuit 16 repeats steps 11 to 16 to sequentially generate the row addresses RAD for eight lines of image data to be stored in the column address direction. Every time the coordinate value Y of each line data in one screen of image data is incremented by "1" (step 16), "64" is added to the line column address CAa (step 11). In the next step (step 12), the pixel row address RAb is set to "0". Steps 11 and 16 are then executed until the line column addresses CAa for eight lines of pixel data are generated (step 13). Thereafter, "10" is added to the line row address RAa in step 14 and the line column address CAa is set to "0" in step 15. Until the coordinate value y becomes 480 (step 2) and the pixel row address RAb changes from "0" to "10" and so forth to "600", the raster address circuit 16 repeats the steps 3 to 16 to generate the raster address RAD for one screen of image data.

Figure 9:
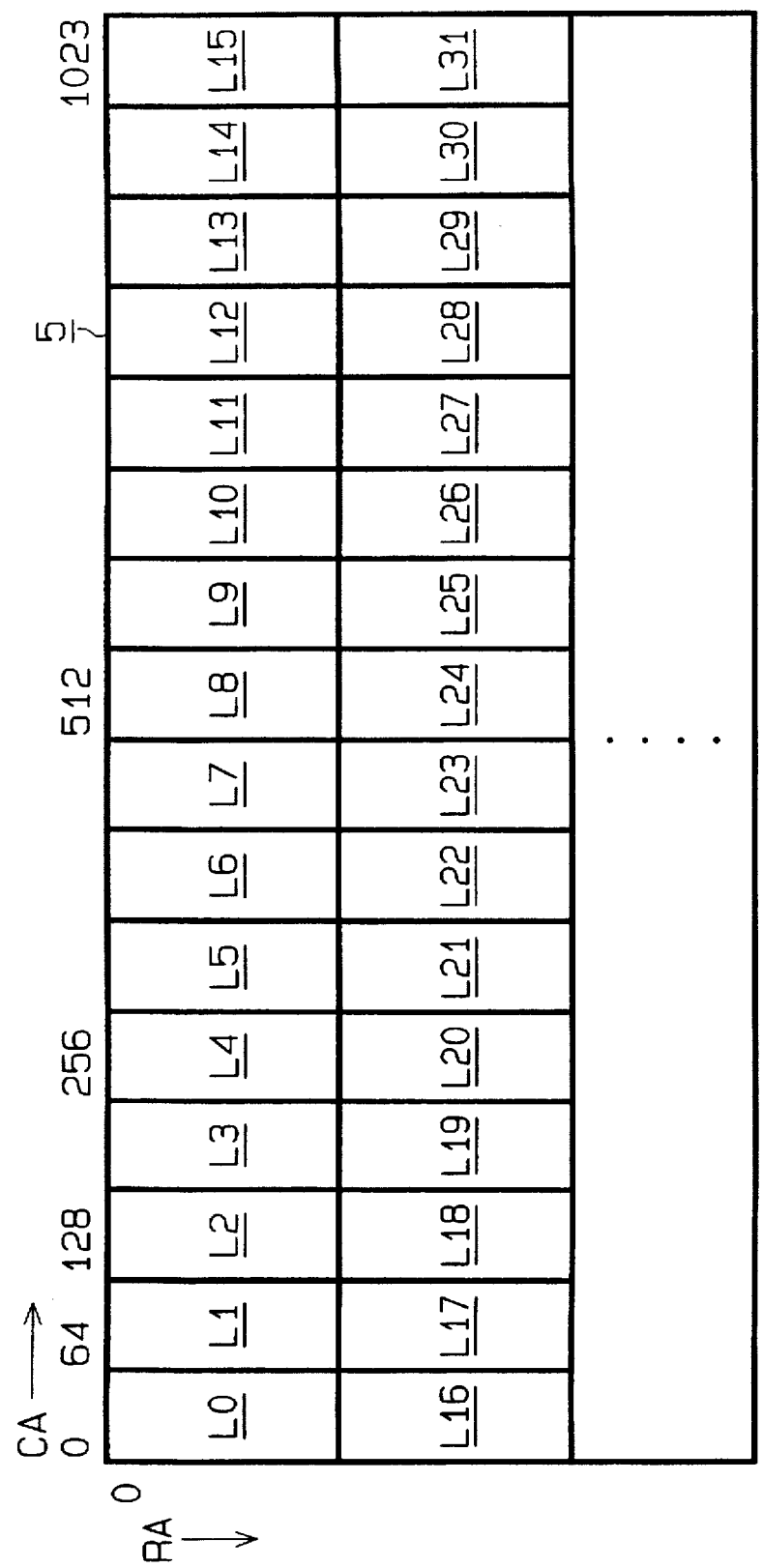
FIG. 9 is a diagram illustrating mapping of image data into a frame memory according to a modified first embodiment of the invention.

Instead of generating a raster address RAD for every eight lines in the row addresses RA direction, the raster address RAD may be generated for access for every sixteen lines as shown in FIG. 9. Further, the raster address RAD for an access for any other number of lines which is a multiple of 8, such as 24 lines or 32 lines, may also be generated.

Instead of the raster address RAD for an access for every 64 pixels in the direction of row addresses RA, the raster address RAD for an access for every 16 pixels, 24 pixels, 32 pixels or 128 pixels, for example, may also be generated.

Block Access Address Generator

The block access address generator (hereinafter simply referred to as "block address circuit") 17 generates a block address BAD using information about the position of each block in image data and the positions of pixels in that block, and supplies this address BAD to the memory controller 13. The memory controller 13 accesses the frame memory 5 in accordance with that block address BAD in such a way that the input image data D1 is read in a raster manner from the frame memory 5 or the decompressed image data D3 is stored in a raster manner in the memory 5 in the record mode.

Specifically, the block address circuit 17 generates the block address BAD using information on the block position p to be accessed and the pixel position q in the block to be accessed. For example, image data G1 having 640×480 pixels shown in FIG. 5 is accessed in 4800 blocks, and the block positions p are identified from "0" to "4799" and the pixel positions q are identified from "0" to "63". In other words, the block positions p are expressed by the numbers which are sequentially given in a raster manner of 8×8 pixels in the horizontal and vertical directions with the upper left position of the image data G1 as a reference, while the pixel positions q are expressed by the numbers which are sequentially given pixel by pixel in the horizontal and vertical directions with the upper left position of each block as a reference.

Using the information of the block and pixel positions, the block address circuit 17 generates the line address (RAa, CAa) for accessing each block in the image data G1 and the pixel address (RAb, CAb) for accessing eight pieces of pixel data in each block and the column address CAc corresponding to the position of pixel data to be accessed. The block address circuit 17 adds the line address (RAa, CAa), the pixel address (RAb, CAb) and the column address CAc together and supplies the result as the block address BAD (RA, CA) to the memory controller 13.

Access to the frame memory using the block address BAD will be discussed below with reference to FIG. 8.

As shown in FIG. 8, the pixel data p(0, 0) to p(7, 0) of the line L0 through the pixel data p(0, 7) to p(7, 7) of the line L7 are accessed in such a manner that image data in read from the frame memory 5 in the units of blocks B1, each having about 8×8 pixels. This block B1 corresponds to the block B1 encircled by the broken line in FIG. 5. The pixel data p(0, 0) to p(7, 0) of the line L0 are stored in accordance with the fixed row address RA0 and the column addresses CA0–CA7. The pixel data p(0, 7) to p(7, 7) of the line L7 are stored in accordance with the fixed row address RA0 and the column addresses CA448–CA455. Therefore, the pixel data p(i, j) [i=0 to 7, j=0 to 7] of the lines L0 to L7 are stored in accordance with the fixed row address RA0 and the column addresses CA64j+i. This technique permits the memory controller 13 to access the frame memory 5 to read pixel data in a raster manner in the fast page mode without performing page-out.

The block address circuit 17 also writes the compressed image data D2 in the frame memory 5 in a raster manner in accordance with the block address BAD. As the row address is fixed, the memory controller 13 is able to write image data in a raster manner without page-out.

Figure 4:
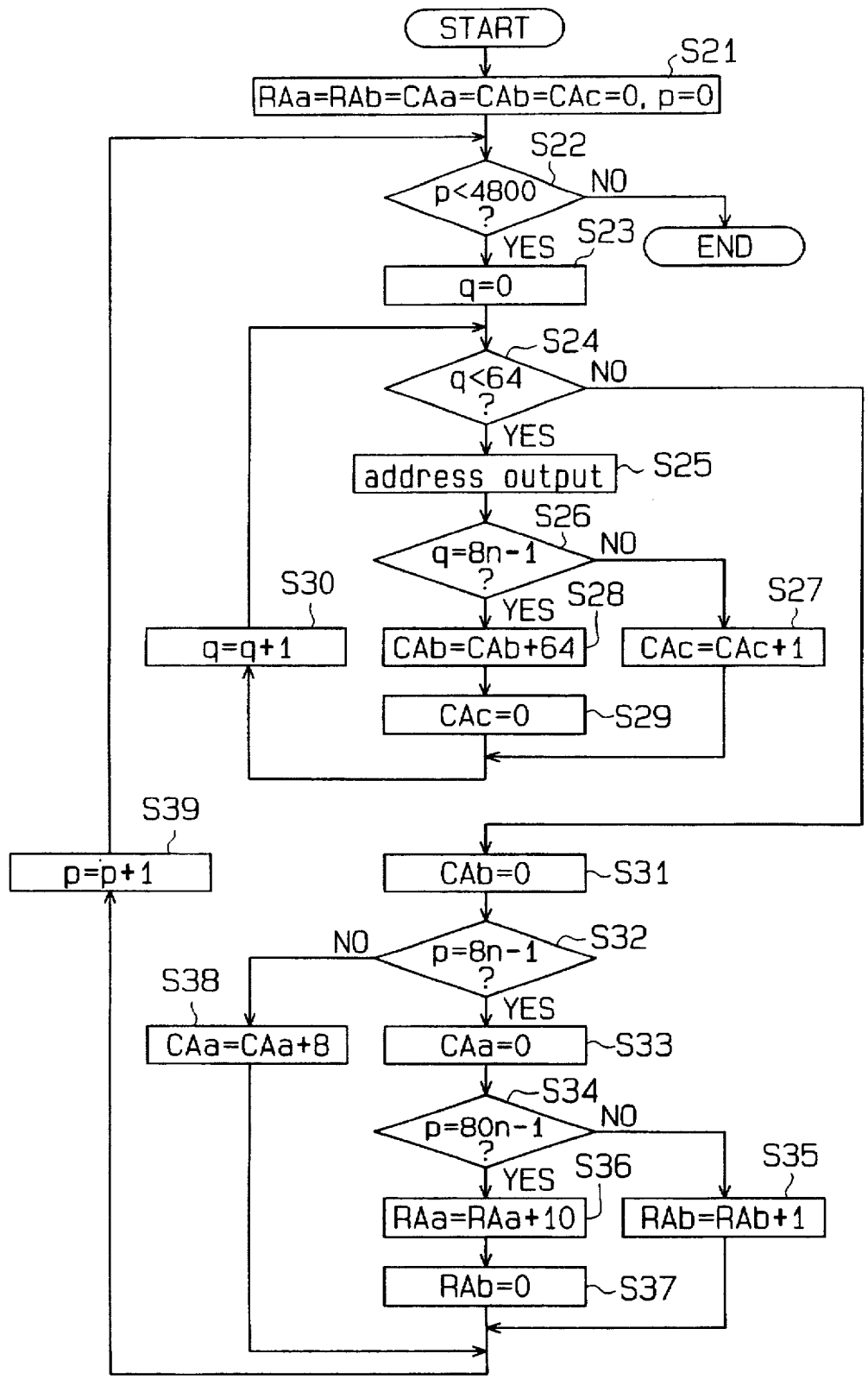
FIG. 4 is a flowchart illustrating the operation of a block access address generator in the image processing apparatus in FIG. 1.

The generation of the block address BAD (RA, CA) by the block address circuit 17 will now be discussed with reference to the flowchart in FIG. 4. In step 21, the block address circuit 17 initializes all of the line and pixel row addresses RAa and RAb, the line and pixel column addresses CAa and CAb, and the column address CAc to "0". The block address circuit 17 also sets the block position p to "0".

In step 22, the block address circuit 17 determines based on the block position p if the block address BAD for one screen of image data D1 and D3 has been generated. When the block position p lies between "0" to "4799", i.e., when the block position p<4800, the block address circuit 17 determines that processing of one screen of image data is in progress, and proceeds to step 23. In step 23, the pixel position q is set to "0".

In step 24, the block address circuit 17 determines based on the pixel value q if the block address BAD for one block of pixel data G2 has been generated. When the pixel position q lies between "0" to "63", i.e., when the pixel position q<64, the block address circuit 17 determines that the generation of the block address BAD for one block is in progress, and proceeds to step 25. In step 25, the block address circuit 17 generates the block address BAD (RA, CA). At this time, the block row address RA is generated by adding the line row address RAa and the pixel row address RAb while the block column address CA is generated by adding the line column address CAa, the pixel column address CAb and the column address CAc.

Repeating steps 26 to 30, the block address circuit 17 generates the column addresses CAa, CAb and CAc for one block with the line and pixel row addresses RAa and RAb fixed. That is, every time the pixel position q for one block of image data is incremented by "1" (step 30), "1" is added to the column address CAc (step 27). Steps 27 and 30 are then executed until the block address BAD for eight pieces of pixel data is generated (step 26). Thereafter, "64" is added to the pixel column address CAb in step 28 and the column address CAc is set to "0" in step 29. Until the pixel position q in the block becomes 64 (step 24), the block address circuit 17 repeats the steps 24 to 30 to generate the block address BAD for one block of image data.

Next, the block address circuit 17 repeats steps 31 to 39 to generate the column addresses CAa, CAb and CAc for eight blocks with the line and pixel row addresses RAa and RAb fixed. Every time the block position p is incremented by "1" (step 39), "8" is added to the line column address CAa (step 38). The steps 38 and 39 are executed until the line column addresses CAa for eight blocks are generated (step 32). Thereafter, the line column address CAa is set to "0" in step 33. This step permits the generation of the block addresses for the next eight blocks of image data.

Further, the block address circuit 17 adds "1" to the pixel row address RAb (step 35) until the pixel row addresses RAb for all of eight lines of pixel data which forms one block are generated (step 34). In this embodiment, eight lines of pixel data are 80 blocks (640/8). Thereafter, "10" is added to the row address RAa (step 36), and the pixel row address RAb is set to "0" (step 37). Those steps permits the generation of the pixel row address RAb for the next eight lines of image data. Until the block position p becomes 4800 (step 22), the block address circuit 17 repeats the steps 22 to 39 to generate the block address BAD for one screen of image data.

It should be understood that this invention may be embodied in the following forms. This invention may be adapted to image processing apparatuses which conform to other standards other than the JPEG standards, such as the MPEG (Moving Picture coding Experts Group) standards. In this case, the memory controller 13 access the memory in a raster manner in accordance with the number of pixels (3×3, 4×4, 6Δ6, 16×16, or the like) which conforms to the selected standards. Further, the number of pixels in image data to be accessed in a raster manner and the capacities of the buffer memories 12 and 14 should preferably be set to match the block unit.

The second embodiment of this invention will now be described with reference to the accompanying drawings. To avoid the redundant description, like or same reference numerals are given to those components which are the same as the corresponding components of the first embodiment.

Figure 10:
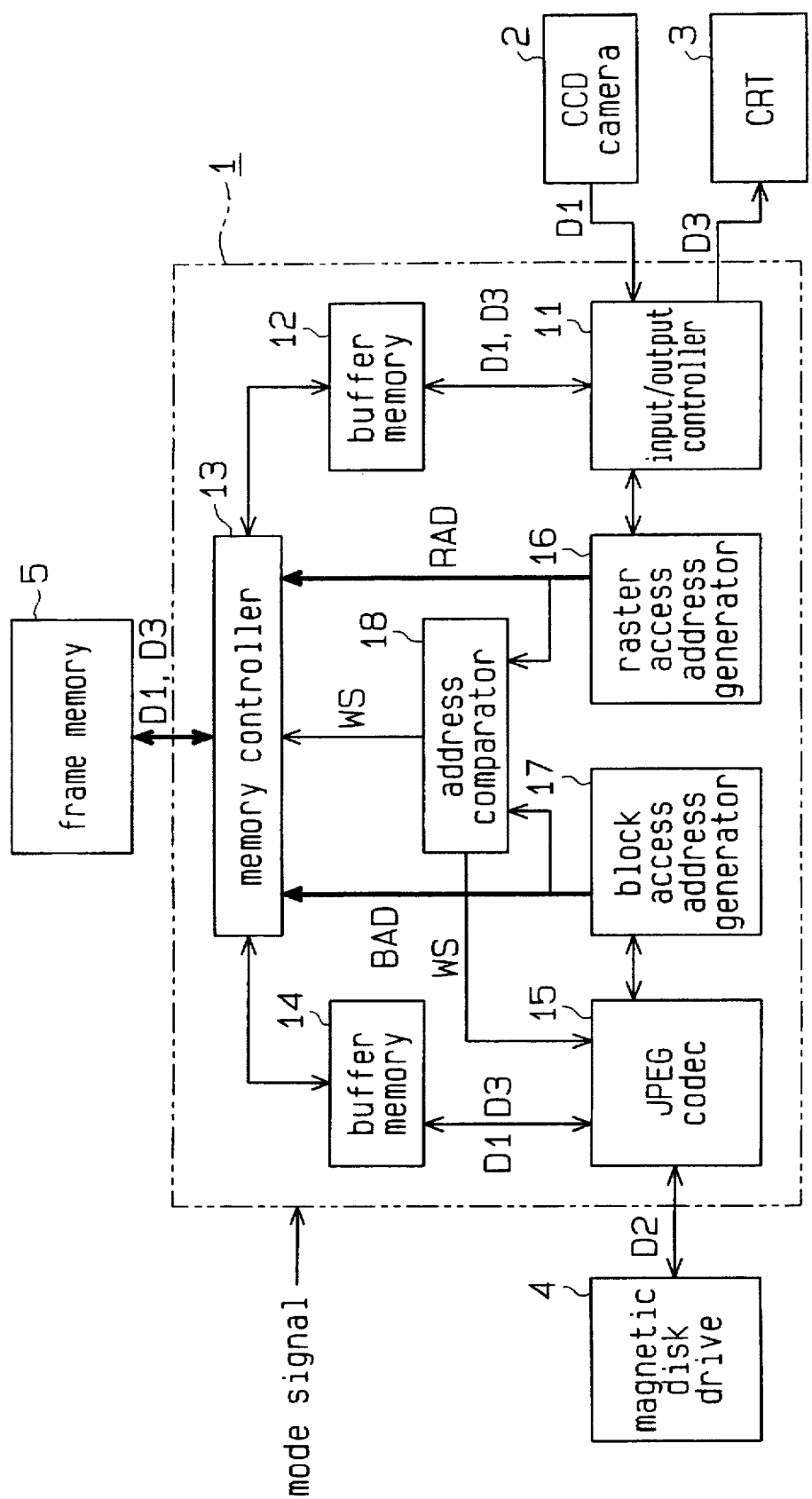
FIG. 10 is a block circuit diagram of an image processing apparatus according to a second embodiment of the invention.

As shown in FIG. 10, the image processing apparatus 1 of the second embodiment includes an address comparator 18 in addition to the circuits of the first embodiment (i.e., the input/output controller 11, the buffer memories 12 and 14, the memory controller 13, the JPEG codec 15, the raster access address generator 16 and the block address generator 17).

The address comparator 18 receives the raster address RAD and block address BAD from the address circuits 16 and 17, and compares both addresses RAD and BAD with each other. The address comparator 18 sends a standby signal WS to the memory controller 13 and the JPEG codec 15 in accordance with the comparison result. When there is a possibility of the block address BAD overtaking the raster address RAD, an active (e.g., H-level) standby signal WS is output. When the block address BAD does not overtake the raster address RAD, an L-level standby signal WS is output. Specifically, the address comparator 18 compares the row address RAa of the raster address RAD with the row address RAb of the block address BAD, and outputs the H-level standby signal WS when there is a possibility of the row address RAb overtaking the row address RAa.

In response to the L-level standby signal WS, the memory controller 13 accesses the frame memory 5 in accordance with the raster and block addresses RAD and BAD. In response to the H-level standby signal WS, the memory controller 13 accesses the frame memory 5 in accordance with the raster address RAD alone. In other words, no access according to the block address BAD is performed. When there is a possibility of the block address BAD overtaking the raster address RAD, only writing of the input image data D1 in a raster manner in the frame memory 5 or reading of the decompressed image data D3 in a raster manner from the memory 5 is executed.

Accordingly, the JPEG codec 15 executes compression and decompression in response to the L-level standby signal WS. In response to the H-level standby signal WS, the JPEG codec 15 stops the compression (reading of image data from the buffer memory 14 for compression) and decompression.

Figure 11:
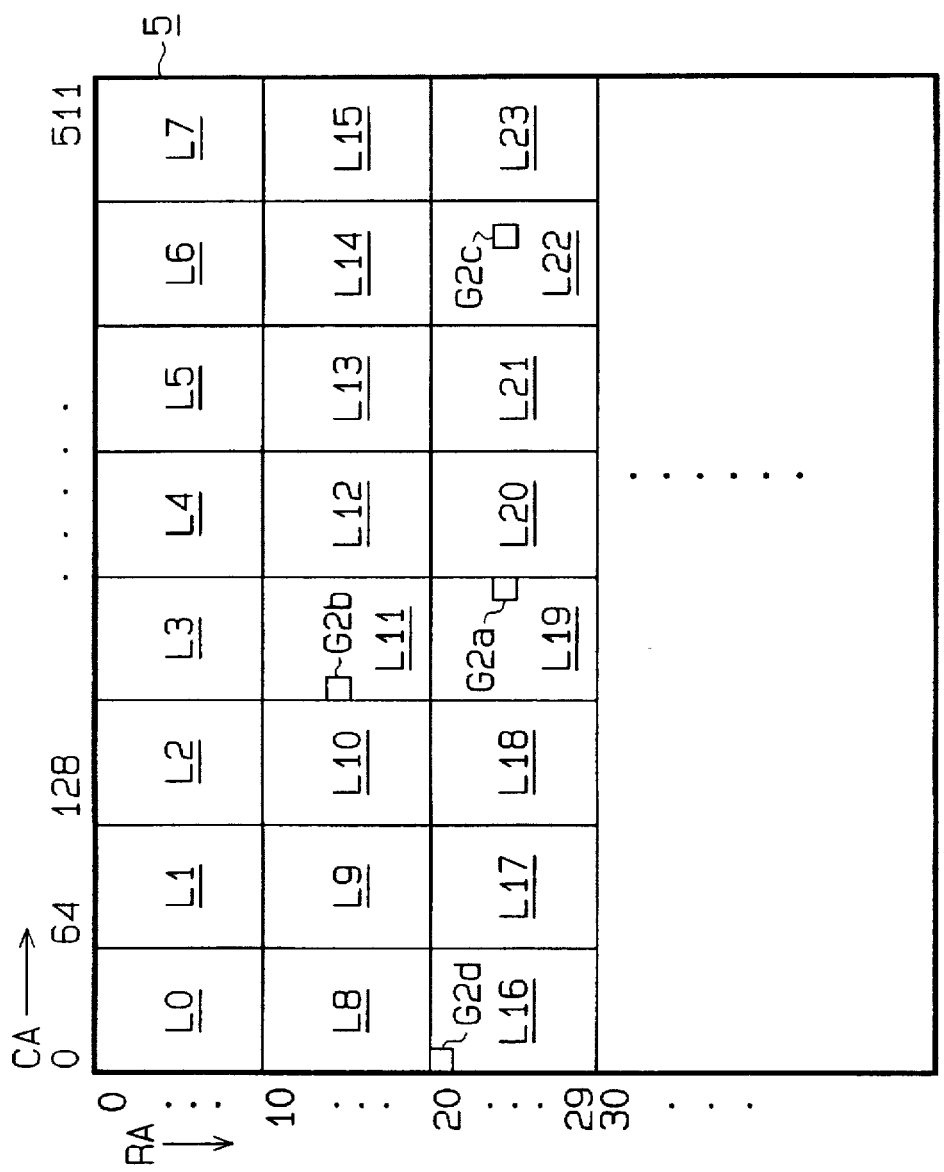
FIG. 11 is a diagram showing one screen of image data stored in a frame memory.

Case 1: Let us pay attention to pixel data G2a in line image data L19 to be accessed in a raster manner, the pixel data G2b in line image data L11 to be accessed in a raster manner, as shown in FIG. 11. The raster address RAD (RAa, CAa) for the pixel data G2a is (24, 255), and the block address BAD (RAb, CAb) for the pixel data G2b is (14, 192).

Using the row address RAa "24" of the pixel data G2a, the address comparator 18 computes the row address RAL "20=(24/10)×10" of the top pixel data in the line L19. (This computation of RAL will be discussed later.) The address comparator 18 compares the row address RAL "20" with the row address RAb "14" of the pixel data G2b. In this case, the row address RAL for raster access does not coincide with the row address RAb for block-by-block access. The address comparator 18 therefore outputs the L-level standby signal WS. The address comparator 18 outputs the H-level standby signal WS when the next computed block address BAD and row address RAL match with each other.

Case 2: After the compression and decompression for the line image data L8–L15 by the JPEG codec 15 is done, and block-by-block access for the compression of the next line image data L16–L23 is performed. This access is executed from the block address BAD (RAb, CAb) or the address (20, 0) of the top pixel data G2d of the line L16. Suppose that at this time, the raster access for the line L23 has not been completed and pixel data G2c in the line L22 is being accessed. The address of the pixel data G2c is (23, 480).

Using the row address RAa "23" of the pixel data G2c, the address comparator 18 computes the row address RAL "2=(23/10)×10" of the top pixel data in the line L22. The address comparator 18 compares the row address RAL "20" with the row address RAb "20" of the pixel data G2d. In this case, the row address RAL for raster access coincides with the row address RAb for block-by-block access. The address comparator 18 therefore outputs the H-level standby signal WS.

When the write address is overtaken by the read address, as apparent from the above, the memory controller 13 stops accessing to the frame memory 5 in a raster manner and the JPEG codec 15 stops compression and decompression. Accordingly, the raster address RAD is not overtaken by the block address BAD, and it is advantageously possible to substantially prevent noise from appearing on the screen of the CRT 3.

Referring to FIG. 11, after raster access to the line L23 is performed, the address comparator 18 switches the H-level standby signal WS to the L-level standby signal WS. In response to the L-level standby signal WS, the memory controller 13 performs block-by-block access to the frame memory 5 and the JPEG codec 15 restarts compression and decompression.

For the following reason, the active standby signal WS is output when the row address of the top pixel data in each line matches with the row address RAb to be accessed in a raster manner. As shown in FIG. 8, access to eight lines of pixel data becomes necessary to read the block B1. In other words, reading of a block requires eight lines of image data. On the other hand, raster access needs one line of image data. For block-by-block reading, therefore, it is preferably that raster access precedes block-by-block access by at least eight lines.

Based on the condition that the integer portion of the result of the arithmetic operation is effective, the row address RAL of the top pixel data in the line to be accessed in a raster manner is expressed by $RAL=(RAa/K) \times K$. That is, the remainder of the division of RAa by K is neglected. In the equation, K indicates the number of row addresses RA needed to write one line of image data. Since one line of image data for one screen consisting of 640×480 pixels is stored in the frame memory, turned back and moved down at every 64-th pixel in the column address direction in this embodiment, K=10 (=640/64). That is, the number of addresses is obtained by dividing xmax by n for one screen consisting of xmax×ymax pixels where n indicates the number of pieces of pixel data to be stored in the column address direction.

It should be understood that the second embodiment may be worked out in the following forms. The JPEG codec 15 may determine the execution and inhibition of the compression and decompression processes in accordance with the amount of data (Full/Empty) stored in the buffer memory 14. In the compression of image data, when the buffer memory 14 is full, the JPEG codec 15 reads image data from the buffer memory 14 and compresses the image data. In the decompression of image data, when the buffer memory 14 is empty, the JPEG codec 15 decompresses image data and stores the decompressed image data in the buffer memory 14. This structure allows the address comparator 18 to supply the standby signal WS only to the memory controller 13 and not to the JPEG codec 15. This simplifies the structure of the image processing apparatus 1.

The address comparator 18 in the second embodiment may be incorporated in an image processing apparatus which accesses a frame memory where image data in FIG. 5 is directly mapped. In this case, when there is a possibility that the block address BAD will overtake the raster address RAD, the active standby signal WS is output as well.

Although only two embodiments of the present invention have been described herein, it should be apparent to those skilled in the art that the present invention may be embodied in many other specific forms without departing from the spirit or scope of the invention.

Therefore, the present examples and embodiments are to be considered as illustrative and not restrictive and the invention is not to be limited to the details given herein, but may be modified within the scope and equivalence of the appended claims.

What is claimed is:

1. An image processing apparatus for writing or reading image data consisting of plural pieces of element data, arranged in a matrix form of first predetermined numbers of rows and columns, into or from a frame memory, said image data being written in said frame memory in either a raster unit consisting of one line of plural pieces of element data in said first predetermined numbers of rows and columns and a block unit consisting of plural pieces of element data arranged in a matrix form of second predetermined numbers of rows and columns, and being read from said frame memory in a unit different from one used in data writing, said second predetermined number being smaller than said first predetermined number, said image processing apparatus comprising:

a raster access address generator for generating a raster access address for accessing said frame memory to write or read said image data in said raster unit, said raster access address including a raster column address and a raster row address, said raster column address being generated such that a number of raster units corresponding to an integer multiple of said second predetermined number of rows are accessed to said frame memory in a column direction, said raster row address being generated such that said one line of plural pieces of element data is accessed to said frame memory in a row direction while a row line is changed every number of element data equal to an integer multiple of said second predetermined number of columns; and a block access address generator for generating a block access address for accessing said frame memory to write and read said image data in said block unit, said block access address including a block column address and a block row address, said block column address being generated such that plural pieces of said element data are accessed at intervals to said frame memory in a column direction, row by row in said second predetermined number of rows, said block row address being generated such that a same row in said frame memory is accessed while rows of element data in one block are accessed at intervals to said frame memory in column direction in accordance with said block column address.

2. The image processing apparatus according to claim 1, wherein said raster access address generator initializes said raster column address every time a number of raster units corresponding to an integer multiple of said second predetermined number of rows are accessed to said frame memory in a column direction, and adds a third predetermined number to said raster row address every time said raster column address is initialized.

3. The image processing apparatus according to claim 1, wherein said block access address generator adds a number equal to an integer multiple of said second predetermined number of columns to said block column address to update said block column address every time one row of element data in one block is accessed to said frame memory in a column direction.

4. The image processing apparatus according to claim 1, further comprising a processing unit for compressing and decompressing image data in accordance with a predetermined algorithm, said processing unit image data compresses the image data read in a block by block manner from said frame memory in accordance with said block access address and outputs compressed image data, and decompresses said compressed image data and writes decompressed image data into said frame memory in accordance with said block access address.

5. A mapping method for writing or reading image data consisting of plural pieces of element data, arranged in a matrix form of first predetermined numbers of rows and columns, into or from a frame memory, said image data being written in said frame memory in either a raster unit consisting of one line of plural pieces of element data in said first predetermined numbers of rows and columns and a block unit consisting of plural pieces of element data arranged in a matrix of second predetermined numbers of rows and columns, and being read from said frame memory in a unit different from one used in data writing, said second predetermined number being smaller than said first predetermined number, said mapping method comprising:

a first step of writing or reading said image data in said raster unit, said first step includes:
  a step of accessing said frame memory such that a number of raster units corresponding to an integer multiple of said second predetermined numbers of rows are accessed to said frame memory in a column direction, and
  a step of accessing said frame memory such that said one line of plural pieces of element data are accessed to said frame memory in a row direction while a row line is changed every number of element data equal to an integer multiple of said second predetermined number of columns; and a second step of writing or reading said image data in said block unit, said second step includes:
  a step of accessing said frame memory such that plural pieces of said element data are accessed at intervals to said frame memory in a column direction, row by row in said second predetermined number of rows, and
  a step of accessing a same row in said frame memory while rows of element data in one block are accessed at intervals to said frame memory in a column direction in accordance with a block column address for accessing in a column direction in said frame memory.

6. The mapping method according to claim 5, wherein said first step further includes:

a step of initializing said raster column address every time a number of raster units corresponding to an integer multiple of said second predetermined number of rows are accessed to said frame memory in a column direction, and a step of adding a third predetermined number to said raster row address every time said raster column address is initialized.

7. The mapping method according to claim 5, wherein said second step further includes a step of adding a number equal to an integer multiple of said second predetermined number of columns to said block column address to update said block column address every time one row of element data in one block is accessed to said frame memory in a column direction.

8. An image processing apparatus comprising:

a frame memory for storing image data consisting of plural pieces of element data, arranged in a matrix form of first predetermined numbers of rows and columns, a memory controller for controlling access to said frame memory for writing or reading said image data in or from said frame memory, said memory controller for accessing said frame memory in either a raster unit consisting of one line of plural pieces of element data in said first predetermined numbers of rows and columns or a block unit consisting of plural pieces of element data arranged in a matrix of second predetermined numbers of rows and columns, said second predetermined number being smaller than said first predetermined number;

a raster access address generator, connected to said memory controller, for generating a raster access address for accessing said frame memory to write or read said image in said raster unit;

a block access address generator, connected to said memory controller, for generating a block access address for accessing said frame memory to write or read said image data in said block unit; and an address comparator, connected to said raster access address generator and said block access address generator, for comparing said raster access address with said block access address and supplying an interruption signal for causing said memory controller to interrupt access to said frame memory in accordance with a difference between said raster access address and said block access address.

9. The image processing apparatus according to claim 8, further comprising a processing unit for compressing and decompressing image data in accordance with a predetermined algorithm, said processing unit image data compresses the image data read in a block by block manner from said frame memory in accordance with said block access address and outputs compressed image data, and decompresses said compressed image data and writes decompressed image data to said frame memory in accordance with said block access address, said processing unit further being connected to said address comparator to interrupt compression and decompression in response to said interruption signal.

10. The image processing apparatus according to claim 8, wherein said raster access address includes a raster column address and a raster row address, and said raster access address generator generates said raster column address such that a number of raster units corresponding to an integer multiple of said second predetermined number of rows are accessed to said frame memory in a column direction, and generates said raster row address such that said one line of plural pieces of element data is accessed to said frame memory in a row direction while a row line is changed every number of element data equal to an integer multiple of said second predetermined number of columns; and said block access address includes a block column address and a block row address, and said block access address generator generates said block column address such that plural pieces of said element data are accessed at intervals to said frame memory in a column direction, row by row in said second predetermined number of rows, and generates said block row address such that a same row in said frame memory is accessed while rows of element data in one block are accessed at intervals to said frame memory in a column direction in accordance with said block column address.

* * * * *